Sept. 17, 1929.  H. W. COTTON  1,728,724
APPARATUS AND METHOD FOR MAKING ROSETTE BLANKS
Filed July 29, 1927  4 Sheets-Sheet 1

INVENTOR
*Howard W. Cotton*,
BY
*Harold D. Penney* ATTORNEY

Sept. 17, 1929.  H. W. COTTON  1,728,724
APPARATUS AND METHOD FOR MAKING ROSETTE BLANKS
Filed July 29, 1927  4 Sheets-Sheet 2
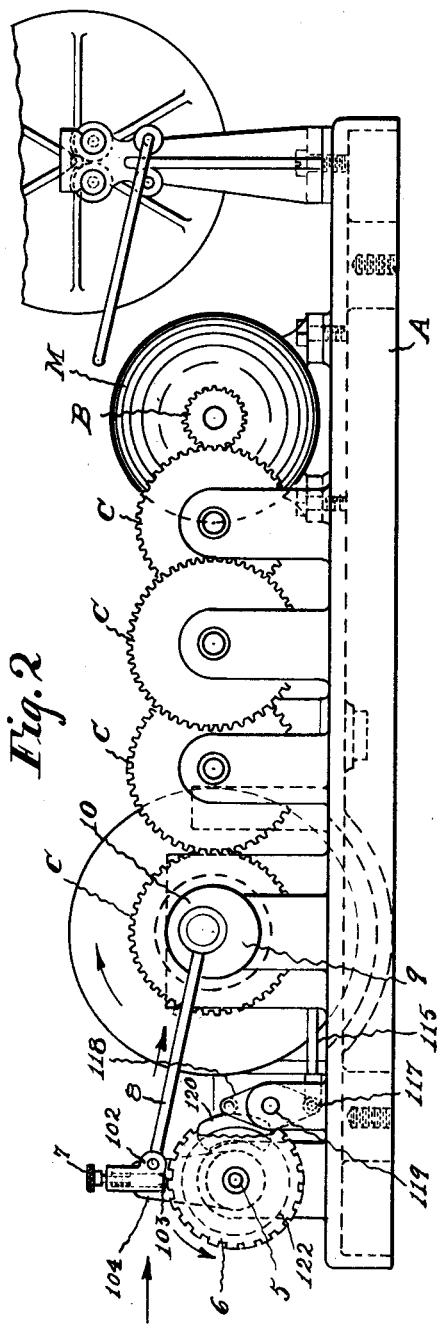
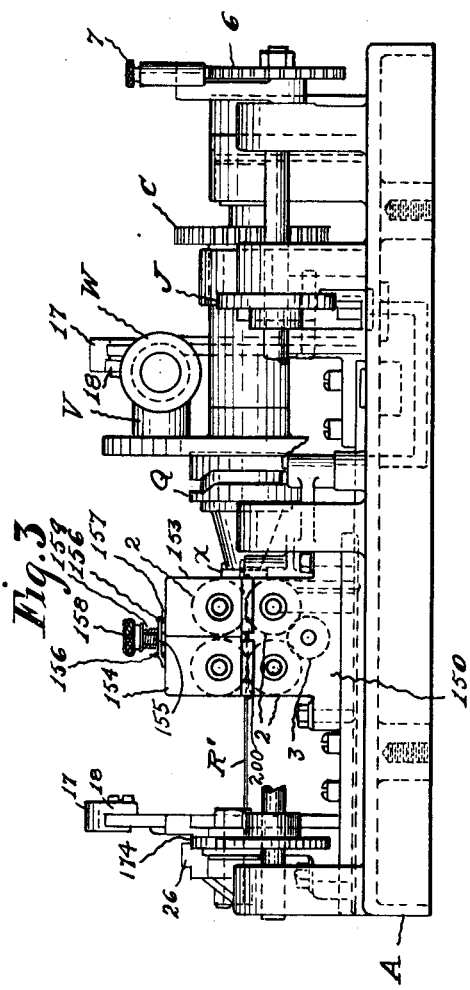
INVENTOR
*Howard W. Cotton,*
BY
*Harold D. Penney* ATTORNEY Sept. 17, 1929.  H. W. COTTON  1,728,724
APPARATUS AND METHOD FOR MAKING ROSETTE BLANKS
Filed July 29, 1927   4 Sheets-Sheet 3
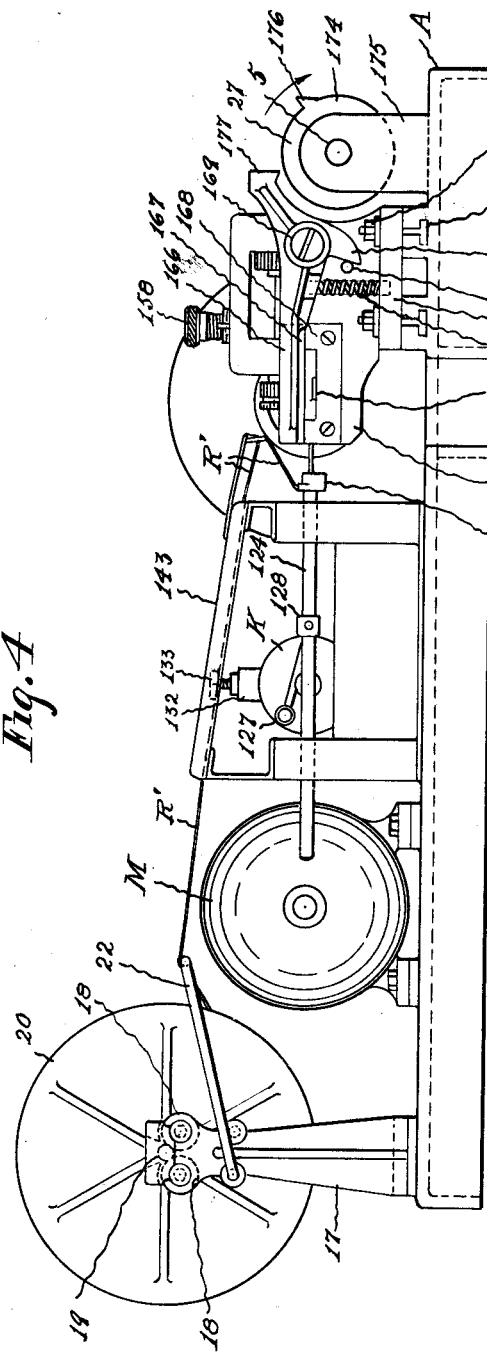
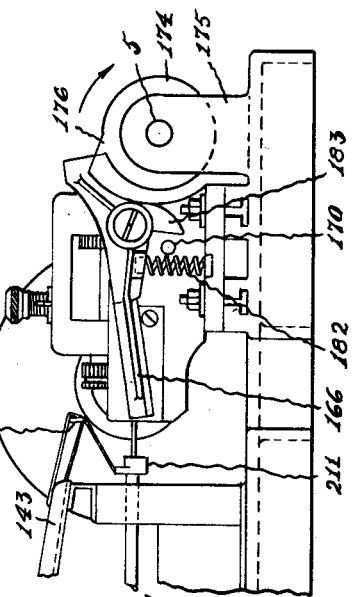
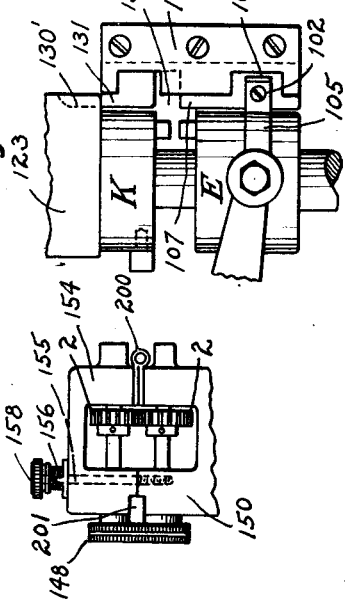
INVENTOR
*Howard W. Cotton,*
BY
*Harold D. Penney* ATTORNEY Sept. 17, 1929. H. W. COTTON 1,728,724
APPARATUS AND METHOD FOR MAKING ROSETTE BLANKS
Filed July 29, 1927 4 Sheets-Sheet 4
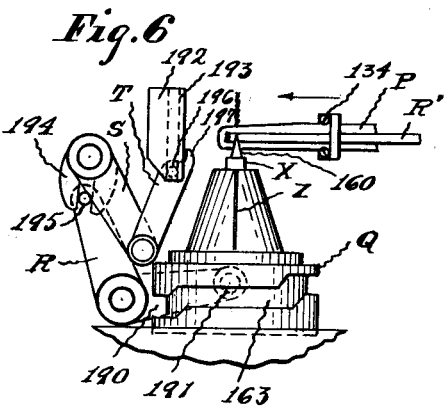
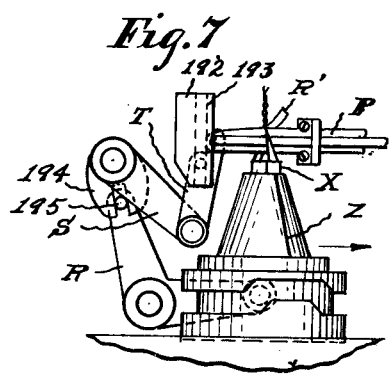
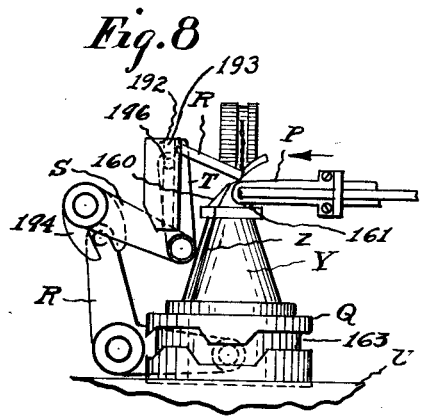
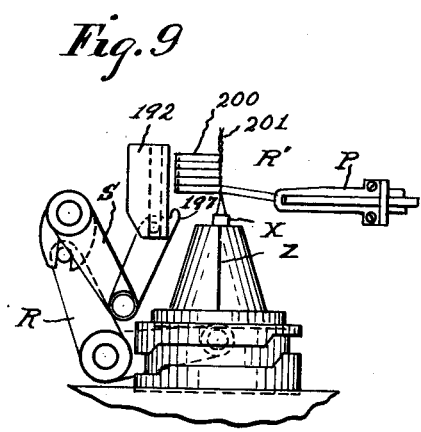
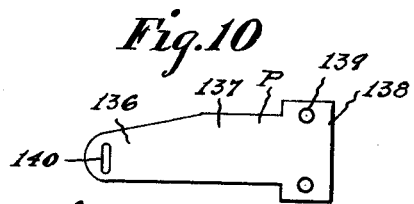
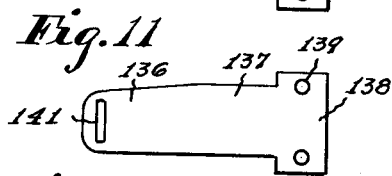
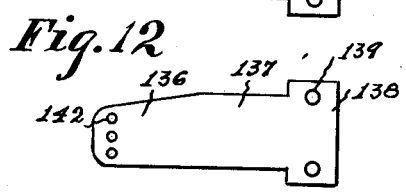
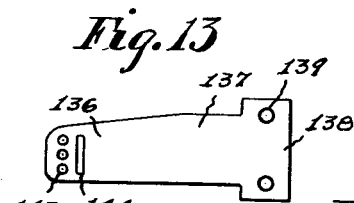
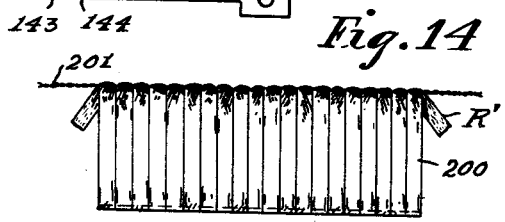
INVENTOR
Howard W. Cotton,
BY
Harold D. Penney ATTORNEY Patented Sept. 17, 1929

1,728,724

UNITED STATES PATENT OFFICE

HOWARD W. COTTON, OF BROOKLYN, NEW YORK, ASSIGNOR TO STARK BROTHERS RIBBON CORPORATION, OF NEW YORK, N. Y., A CORPORATION OF NEW YORK

APPARATUS AND METHOD FOR MAKING ROSETTE BLANKS

Application filed July 29, 1927. Serial No. 209,310.

My present invention relates to methods of making and an improvement in machines for making rosette blanks, of suitable fabric, such as silk ribbon or yarns or the like, for ladies' wear, as an ornament, and contemplates, among other things, the utilization of a ribbon or yarn of the class described, in combination with a soft iron wire whereby blanks of the kind described are made up through the automatic looping of the ribbon in combination with the twist of the wire as a foundation to bind the loops together.

In the making of these rosette blanks it is also contemplated to make a series of spaced blanks, in a continuous length, to be cut apart, for use to be later described, and also the provision of means whereby only a predetermined number of ribbon loops will be made in each blank, as desired.

The foregoing involve methods of procedure which will hereinafter be fully outlined, and it is to be understood that modifications may be made in the use of materials and the manner of twisting together without departing from the spirit of the invention herein or the scope of the appended claims.

In the rosette blank as described, after the blank has been made, it is intended to be twisted upon the wire foundation formed in combination with the yarns or ribbons used, in such a manner as to form a plural-petaled imitation of a flower.

In the drawings:

Fig. 2 is a front elevation looking in direction of arrow 2.

Fig. 3 is a side elevation looking in the direction of arrow 3.

Fig. 4 is a rear elevation looking in the direction of arrow 4.

Fig. 5 is a fragmentary section of Fig. 4.

Figs. 6, 7, 8 and 9 are fragmentary plan views showing the position of a complete cycle of the mechanism for forming and twisting loops from the continuous strip ribbon.

Fig. 10 is a plan view of the needle.

Fig. 11 is a modification of the needle.

Fig. 12 is another modification of the needle.

Fig. 13 is still another modification of the needle.

Fig. 14 is the article as produced by my machine.

Fig. 15 is a detail view of the clutch sliding plate mechanism.

Fig. 16 is a detail view of the hinged block mechanism.

Figure 1:
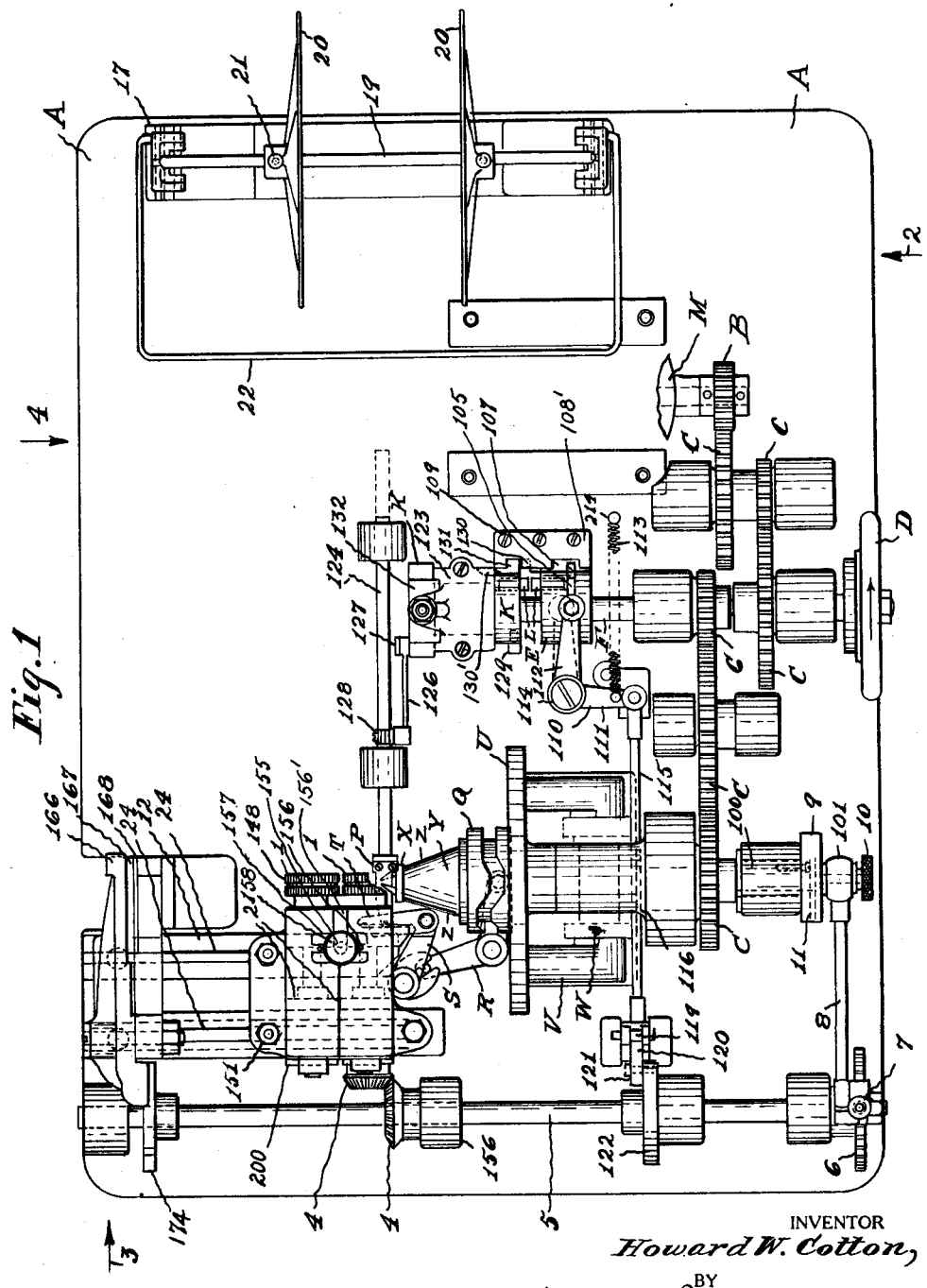
Fig. 1 is a plan view of the machine.

Referring more particularly to the details of my construction in Fig. 1 A refers to the base of the machine and suitably disposed thereon is the motor M (see Fig. 2). Associated with the motor is the pinion B meshing with gear C and the latter actuates the gear train C—C—C. Disc U having the wing members V is carried by shaft 100 embodying gear C. Mounted on shaft 100 is the eccentric 101 associated with the connecting rod 8. The eccentric is adjustable by unloosening knurled nut 10, and shifting the eccentric 101 then tightening the knurled member.

To provide an intermitted feed to shaft 5 extending transversely of the base A, notched disc 6 is provided at one terminal thereof co-operating with the spring actuated plunger 7 having the bevelled terminal 103. The plunger acts as a one way pawl and is contained within the casing 102' bodily associated with bracket 104 pivotally mounted on the transverse shaft 5. Connecting rod 8 suitably joins the eccentric 101 with the casing 102'. When the connecting rod is actuated by the eccentric, it is apparent that the bevelled edge 103 will ride over a shoulder of the notches and register with the adjacent recess in the notched disc. Obviously when this takes place the plunger 7 locks the notched disc and precludes further rotation thereof until further actuation of the connecting rod by the eccentric.

In my invention, I have provided means for intermittently actuating ribbon feeding means for cooperating with a wire twister in order that the ribbon loops embodying the rosette may be firmly secured. To this end, therefore, shaft F is provided transversely of the machine. Disposed upon shaft F are the gears C C forming a part of the gear train previously referred to, the clutch elements E and K, and the bodily movable head K—K. The clutch comprises the complemental sections E and K and each of these sections contains a projecting lug or pin L. Section E is slidably mounted in a restricted keyway on shaft F and arranged thereon is the annular member 105 having projection 102 extending into recess 108 of the slidable plate 107. The latter is slidably secured to the gib plate 108'. The gib plate 108' is secured to the machine frame by the fastening means 109.

Associated with the annular member 105 is the bell crank lever 110 comprising arms 111 and 112 swiveled at 114. Arm 112 embodies a bifurcated or forked terminal and this portion is suitably attached to the annular member 105. Arm 111 of the bell crank cooperates with the yielding resistance spring 113 preferably sustained by the frame of the machine at 214. Attached at the terminal of arm 111 is the connecting rod 115 suitably connected with the cam lever 118 and 117 (see Fig. 2). Preferably the cam lever is loosely carried by the pin 119. Cooperating with the cam lever is the cam 120 which is detachably mounted by the fastening means 121 to the overlapped disk 122 journaled to shaft 5. With this construction it will be apparent that when cam 120 is actuated by shaft 5, it will engage the cam lever 118 moving the upper portion inwardly and its lower portion outwardly. Consequently connecting rod 115 will be longitudinally displaced. Therefore, arm 112 of the bell crank lever will be shifted transversely causing section E of the clutch to move away from the revoluble complemental clutch section K.

After the cam 120 and cam lever 118 are out of engagement, the spring 113 retracts arm 111 and causes section E to shift towards section K. When this takes place the clutch sections will become locked by the engagement of the cooperating extension L and L. Accordingly the driving head which is bodily movable with section K but loosely arranged on shaft F, likewise will rotate and consequently reciprocate the needle carrying rod 124. In this connection it should be noted that the crank arm 126 is operatively associated with fastening means 128 on the needle carrying rod 124 and the swivel connection 127 on the driving head. For stopping the rotation of section K after disengagement thereof by the complemental portion E, a lug 129 is provided on the clutch. The sliding plate 107 contains a recess 108 and is reciprocated by the projection 102 which fits almost wholly in the recess 108 as shown in Fig. 5. When the swivelled bell crank 111 and 112 actuates section E through the action of spring 113 and connecting rod 115 the section E will move the sliding plate 107 axially toward clutch K, and the portion of plate 107 adjoining the bearing 123 will slip into slot 130' formed in 123. In clutch operating position, lug 129 will register and revolve in the recess 130. However, upon disengagement of the clutch through the operation of the connecting rod 115, plate 107 will move axially away from the outside surface of section K. Accordingly, lug 129 will engage the portion 131 of the plate 107. In other words, portion 131 is an abutment providing a stop for the lug 129 in bringing section K stationary.

Adjustable retarding means for the freely revoluble section of clutch K is also provided and in this connection 132 designates a brake member disposed adjacent one end of clutch K (see Fig. 4). The vertical disposed detachable element 133 is provided for adjustment of the desired brake pressure. The braking surfaces, are preferably lined with leather and of course their faces retard the rebound developed by the engagement of the solid portion 131 of plate 107 with the lug 129.

It will be noted that the reciprocable connecting rod 124 is provided at one terminal with a needle P (see Figs. 1 and 6 to 13 inclusive) connected thereto by any suitable means. The needle consists of a flat plate P (see Fig. 10) having a contracted portion 136, intermediate section 137 and the enlarged portion 138. The enlarged portion 138 of each of the modifications shown in Figs. 10 to 13 inclusive is provided with a pair of spaced perforations to accommodate suitable fastening means whereby the needle may be secured to the connecting rod 124. In Fig. 10 the needle contains the slot 140. In Fig. 11 the slot is of slightly different design than that of Fig. 10. In Fig. 12 a series of perforations are provided. In Fig. 13 the combination of a slot 14 and perforations are provided on the needle. The slot is a guide for the continuous ribbon. The perforations are the directing means for yarn which may be used in place of the continuous strip ribbon. From Fig. 13, it will be apparent, that a combination of colors in yarn and a continuous ribbon strip may be fed concomitantly to the clamp toggle RST and the wire twister $x$.

Mounted at one end of the frame A (see Figs. 1 and 4) is the ribbon or yarn supply rolls which may be arranged on shaft 19 loosely secured and confined between the antifriction rollers 18—18, the latter being held by the vertical extending spaced brackets 17 mounted on the base of frame A. A clevis or U-shaped arm 22 is preferably attached to each of the brackets and acts as a spacer to keep the feeding ribbon or yarn away from the motor M. For a supplemental guide in directing the ribbon R to needle P the inclined chute 143 is disposed between clevis 22 and the reciprocable bar 124 embodying needle P. Disk plates 20 which confine the spool of ribbon adapted to be mounted on shaft 19 are adjustable along shaft 19 through the detachable fastening means 21.

In my construction provision has been made to transform the straight continuous ribbon into a plurality of contiguous loops formed upon a twisted wire and suitably fastened thereby. Further provision is also made for making a series of spaced groups of contiguous loops on the twisted wire. To this end it will be seen that the intermittent actuated shaft 5 embodies the beveled gear 4 which meshes with a similar complemental beveled gear connected to end of lower shaft that rotates the first of rollers 1—1 and gears 2—2. The intermediate gear 3 being an idler is similarly connected with pinion 2 and actuates the other lower wire feeding gears 2—2 which are confined within the adjustable lower block 150, the latter being of an inverted T-shape and is suitably and slidably secured in the spaced and slotted tracks 24 by the adjustable members or bolts 151. A complemental upper bearing block 152 embodying the individual and separate parts 153 and 154 are separately hinged to the lower block 150 by hinges 200 as shown in Fig. 16. The upper wire feed reels 1—1 are driven by the upper gears 2—2. To allow the independent sectional members 153 and 154 "to give" when a stretch of twisted wire containing the series of loops pass between the wire feeding means, a stud 155 is provided which as shown in Figs. 1 and 16, extends between the upper hinged sections 153, 154 through the portion 156' which is cut away from the hinged blocks 153, 154 at their contacting sides, and is secured to the lower block 150. Each upper block is provided with a pin 156. A slotted plate 157 is arranged to overlap each of the upper blocks 153 and 154 and over pins 156. Between the slotted plate 157 and the knurled terminal 158 of stud 155 is disposed the resilient spring 159. With this arrangement, it will be appreciated that since the second of the lower wire feed rolls 1—1 are driven through the intermediate feed idler 3, lower propelling gears 2—2 will rotate in the same direction. Likewise during the progression of the series of contiguous loop in passing first between the hinged section 153 and the lower block 150 and the passage 201, the former will rise against the tension of spring 159 to accommodate for the inequalities in the width of the loops formed from the continuous strip of ribbon. However, the pivoted complemental block 154 remains in its normal position until the stretch of loops arrive and engage the wire feed rollers actuated within the upper section 154 and the lower block 150. In this position, of course, pivoted block 154 is elevated and the section 153 is in normal position. The pivoted blocks 153 and 154 and the lower block 150 are slidably disposed on the slotted rails or tracks 13—14 for the reception of various sizes of ribbons. It should be noted that gear 4 on shaft 5 may be bodily movable and secured thereon by any suitable means to accommodate for the adjustment of the lower block 150.

The wire twister comprises a cone Y containing the cylindrical portion Q concentrically and suitably disposed on disk U (see Figs. 1, 6 to 9 inclusive). As previously mentioned the rotatable disk U embodies the extending arms V which suitably support a pair of spools of wire W. Carried by the contracted portion of cone Y is the disk x embodying a pair of spaced inclined tubular tapering protuberances 160 and 161. The cylindrical portion Q is provided with one irregular cam-shaped slot 163, the purpose of which will be hereinafter disclosed. Plate X embodies a pair of spaced apertures to accommodate the wires feeding from the pair of spools disposed within the arms V. The wires are passed through the disk U, extend along the surface of cone Y, project through oppositely disposed perforations in plate X, and are threaded through the hollow protuberances 160 and 161. The free end of the wire is extended between the knife 166 having cutting edge 167 and the open plate 168 carried by the knife holder 180. Knife holder 180 is adjustably mounted on base A by means of the inverted T-headed bolts 173 slidably disposed in corresponding inverted T-shaped recesses 172.

The knife 166 is pivotally mounted at 169 and is actuated by cam 174 having the single tooth 176 cooperating with extension 177 of the cutter 166. Integral with the cutter 166 and depending downwardly thereof is the lug or projection 183 which acts to limit the upward movement of the cutter in cooperation with the pin 170. The yieldable resistant spring 182 is disposed between the cutter 166 and base supporting plate 181 of the cutter holder 180. In Fig. 4, the knife 166 is in its normal position, that is, in the uncutting position being returned thereto by the resilient spring 182. In this position the extension 183 of the cutter 166 acts against the abutment pin 170. In Fig. 5, cutter 166 has been actuated by the extension 177 through the cam tooth 176, and accordingly in this position, has sheared the ribbon R. When tooth 176 disengages the extension 177 the knife 166 returns to its normal position.

The mechanism for forming the series of loops from the continuous strip ribbon R may be best understood from the structure shown in Figures 6 to 9 inclusive. It will be seen that pin 191 disposed at one end of the bell crank R is loosely confined within the recess 163. A swivel connection embodying the arms S and T cooperates with the bell crank R and the stationary member 192 respectively. Disposed at one end of link or arm S is the bifurcated element 194 cooperating with pin 195 extending from the bell crank R. Link or looper T which is swiveled with link S contains at one terminal thereof the sharp projection 197 in order to grip or catch the free end of the ribbon R after the latter has been threaded through the needle P. In Figure 6 the needle carrying rod 124 has carried the ribbon R within close proximity to the projection 197 of looper T. By reason of the rotary motion imparted to the cam Q actuating the toggle consisting of the arms 190, link R, bifurcated plate 194, link S, looper T and the reciprocating motion imparted to the connecting rod 124 carrying the ribbon threaded needle P projection 197 will pass underneath the needle P and through a loop formed in the ribbon due to the starting of the return stroke of needle P (see Fig. 7). Upon further rotation of the cam Q, looper T holding the loop end of the ribbon until needle P returns to the starting point will travel within the interior of the stationary portion 192 being guided by the recess 193 therein through pin 196. In this way a loop is formed. Now the needle P starts to form a second loop, the looper T has drawn the ribbon from the path of the needle as shown in Fig. 8 holding it thus until the needle reaches the position shown in Fig. 6. Consequently since the cam Q is revolving at this time, the pair of wires about the open terminal of the ribbon will be twisted. The cone Y in rotating therefore twists and fastens the fine wires at the extremities of a complete loop. After a single loop is formed and twisted by the wires, the loop is advanced by the wire feed rollers 1—1. Following this cycle, a second loop is formed contiguous to the first loop and so forth till the desired number of loops in a single group have been produced. When a single loop has been made and fastened, looper T releases the ribbon. In Fig. 9, there is disclosed a plurality of loops 200 formed on the twisted wire 201. It will be readily understood that instead of utilizing a needle with a single slot, a perforated needle may be used, for instance, one of the designs as shown in Fig. 12 wherein a single thread of yarn of variegated colors may be confined within each of the apertures 142. Similarly, loops forming the rosette blank may be made from a combination of yarn threads and continuous ribbon in utilizing the combined perforated and slotted needle of Fig. 13.

In Fig. 14, I have shown the article which is produced by my method. As disclosed a series of closed loops have been formed on the twisted wire 201 forming the rosette blank.

My invention comprehends the production of a plurality of spaced groups of contiguous loops on twisted wires, and the provision of means for forming a predetermined number of loops in each group. In this connection, attention is again directed to Figure 2 in which the slotted disc 6 is shown. Each notch on the slotted disc corresponds to the time required for the production of one loop in each series of loops. Accordingly, where it is desired to form a large number of loops in each group a disc with a larger number of notches should be used to replace disc 6. Conversely where a smaller number of loops are required in a single group, a disc with a lesser number of notches should be used in place of the disc 6. Where a larger or smaller notched disc is used, the eccentricity 101 must be correspondingly changed which is done by unloosening the knurled member 10 and adjusting the eccentricity of cam 101. However, control of the number of loops entering each group is also dependent upon the size of the cam actuating surface of cam 120. Since cam 120 cooperates with the cam lever 118 to disengage the sections of the clutch E and K, it follows that if the cam face 120 is large, the time of the clutch disengagement will be longer. Likewise, the clutch disengagement will be short in time if the cam actuating face 120 is small. In other words, where there is less actuating cam surface between the cam 120 and the cam lever 118, the engagement of the clutch sections will be longer. Consequently the driving head K will actuate and reciprocate the needle P a larger number of times. Of course, after the cam face 120 has passed the cam lever 118 the spring 113 retracts arm 111 and accordingly lugs L L of sections E—K interlock. When the clutch sections E and K are disengaged the feed of the wires Z—Z continues carrying concomitantly the ribbon but untwisted. The wires continue to twist but the ribbon travels in a straight path through the compound the knurled and grooved discs 1—1 previously described. On the other hand, where the cam actuating surfaces of cam 120 and cam lever 118 become out of register during the intermittent rotation of shaft 5, the clutch sections E—K become interlocked. Consequently needle bar P is reciprocated and accordingly the loop formations of the continuous ribbon commence, beginning the development of the second group of loops. Of course after the second loop is produced any number of groups of loops may be made by my machine.

Where it is desired to form an uninterrupted continuous series of loops without grouping, cam 120 may be omitted. In other words, through the omission of cam 120, the clutch would be constantly engaged and therefore the ribbon carrying needle P would be constantly reciprocated. The gear train C—C—C coupling the clutch actuating shaft F and the twister shaft 100 is proportioned to propel the shafts in a two to one relation, to wit,—for every single revolution of shaft F, the twister will revolve one half of a revolution, or for every two revolutions of shaft F, the twister will revolve one.

In the operation of my machine, it will be apparent that a spool of ribbon is placed between the adjustable disc plates 20 on shaft 19. The free end of the ribbon is passed over the guide bar 22 and is carried along the directing chute 143, deflecting plate 210 and bushing 211 to the needle P where it is threaded through slot 140 thereof, with approximately three inches left hanging loosely below the body of the needle. Two independent spools of fine wire are now inserted between the arms V of the twister. The free thread of wire of each spool is passed through the disc U, cylindrical portion Q over cone surface Y as illustrated at Z—Z, through plate X and within the hollow tapering inclined jaws 160 161 (see Fig. 8). The pair of wires are now passed between the upper and lower knurled and grooved discs 1 and are extended to reach between the plate 168 and the cutter 167 of the knife frame. The hinged upper blocks 153 and 154 may be elevated in order that the wires may be manually adjusted within the grooves of the knurled discs 1. Prior to threading the ribbon and wires through the machine the latter is adjusted so that the clutch sections E—K are out of engagement. At this time the handwheel D is turned to rotate shaft F. Consequently the cone will twist the two fine wires. In this way the first few twists are obtained. After the completion of this operation the motor M is energized transmitting power to the pinion B and through the gear train. Following the disengagement of the clutch sections E—K, spring 113 retracts the arm 111 of the bell crank 110. Accordingly the clutch sections interlock and actuate crank 126 to reciprocate the needle bar 124. In moving to the twister X, the threaded needle P will pass between jaws 160 and 161. Projection 197 of looper T travels forwardly under needle P and holding the loop end of the ribbon (see Fig. 7). As the needle starts forward to form the next loop, looper T moves transversely carrying the ribbon therewith by reason of the pin 196 travelling in the slot or groove 193 in the stationary member 192 (see Fig. 8) through the actuation of link R by the cam slot 163. It will be noted that the ribbon has been laterally displaced and consequently will be removed from the path of the needle upon the return stroke thereof. However, the free portion of the ribbon remains held and advanced until the needle has almost completed its forward movement. When this occurs, the wires will be twisted about the side of the ribbon, bearing in mind that for every half revolution of disk U, the bar makes one complete cycle, to wit, fed forwardly completely and retracted completely. After the twisting operation, the needle moves forwardly again, projection 197 enters loop of the ribbon beneath the needle as the needle is withdrawn, the ribbon is advanced and cone Y revolved, twisting the ribbon in the wires. Therefore another loop is formed in the series. This cycle of operation continues until the required number of loops comprising the series have been made. Of course, the number of loops going into a single group is dependent upon the number of notches of disc 6.

Control of the length of the series, as previously set out, is determined by the length of the cam actuating surface 120 in registration with the cam lever 118. Of course, cam 120 may be omitted to obtain an uninterrupted series of loops on the twisted wire.

When the cam 120 and cam lever 118 register, the clutch sections become disengaged; consequently the needle bar does not feed a supply of ribbon between the jaws 160 and 161 of the twister X. However the wires continue to twist carrying with them an uninterrupted portion of continuous ribbon. When the cam lever 118 and cam 120 become out of register, the clutch section interlock and the reciprocable feed of ribbon is continued for the formation of a series of twisted loops comprising the second group. This operation, of course, may be continued until any number of groups of loops have been developed.

After the formation of the spaced groups containing the loops on the twisted wire, the groups are bodily moved and continue to feed, after twisting, to and through the upper and lower sections of the knurled discs 1. The grouping of loops in passing through and between the stationary block 150 and the resiliently maintained block 153 will raise the latter, and in passing between the resiliently maintained block 154 and bearing block 150, will raise the former. The twisted wire containing the grouping of loops continue in its path of travel to the cutting frame 179. When the twisted wire containing the continuous band of ribbon between each grouping of loops register with the position of the knife 166, the intermittent actuated cam 174 controlled by the transverse shaft 5, engages the extension 177. Accordingly the cutter 166 assumes the position shown in Fig. 5 and shears the continuous ribbon strip as well as the twisted wire. In this way as each twisted portion of the wire and continuous ribbon connecting adjacent grouping of a series of loops registers with the position of the cutting plate 167, the latter will be actuated by cam tooth 176 and cut the twisted wire without the loopings. Of course after the cutting operation each group of loops may fall into any suitable receptacle or container disposed below the cutter.

My invention also contemplates the formation of a single twisted wire section embodying a plurality of spaced groupings having a series of loops. To obtain the effect, cam disc 120 and cam 174 are provided to take an additional cam member. Of course, where it is desired to make a continuous series of loops without regard to grouping cams 174 and 120 are removed.

A series of loops 200 of ribbon R twisted into wire 201 of a single group, as produced by my machine is shown in Fig. 14 in blank form embodying the rosette. After the wire is cut, this group falls into a receptacle placed below the machine. Since the wire 201 is fine and flexible, it is obvious that this twisted wire may be bent into a closed circular form into a number of superimposed convolutions. The free extremities of the twisted wire are suitably fastened to the rim formed by the wires 201 after being bent into circular form.

Having thus described my invention with particularity with reference to the preferred method and means of carrying out the same and having referred to some of the possible modifications thereof, it will be obvious, to those skilled in the art, after understanding my invention, that other changes and modifications may be made without departing from the spirit and scope of my invention and I aim in the appended claims to cover such changes and modifications as are within the scope of the invention.

I claim:

1. A machine for making rosette blanks from a continuous ribbon strip into a series of loops in spaced groups comprising, in combination with ribbon and wire supply means, of intermittent ribbon feeding means, wire feeding means associated therewith, and means for forming a predetermined number of loops in a group.

2. A machine for making rosette blanks from a continuous strip of ribbon into a series of loops in a group comprising in combination with wire and ribbon supply means of ribbon feeding means, wire feeding means associated therewith, and means for forming a predetermined number of loops in said group.

3. In a machine for making rosette blanks from a continuous strip of ribbon and wire into a series of loops into a plurality of groups comprising automatic ribbon feeding means, wire feeding means associated therewith, means for forming a predetermined number of loops in said group, and means for severing each group.

4. A machine for making rosette blanks from a continuous strip of ribbon and wire into a series of loops in spaced groups comprising intermittent ribbon feeding means, rotary wire feeding means associated therewith, and means for forming a number of loops in a group.

5. A machine for making rosette blanks from a continuous ribbon strip into a series of loops in a group comprising in combination with ribbon and wire spools therefor of intermittent ribbon feeding means, wire feeding means associated therewith, means for forming a number of loops into groups, and means for severing each group.

6. A machine for making rosette blanks from a continuous strip into a series of loops in combination with ribbon and wire supply means therefor and comprising ribbon feeding means therefor, wire feeding means associated therewith, automatic means for forming a number of loops in a group, and means for severing each group.

7. A machine for making rosette blanks from a continuous strip of ribbon into a series of loops in groups, in combination with ribbon and wire supply means therefor comprising automatic ribbon feeding means, wire feeding means associated therewith, means for forming a number of loops in spaced groups, and means for severing each of the groups.

8. In a rosette machine for making rosette blanks from ribbon and supply means in combination with a base, of power means supported thereby, means responsive to said power means whereby loops are formed in groups, and means for twisting the wire about one portion of said loops.

9. In a machine for making rosette blanks in combination with ribbon and supply means therefor, power means associated therewith, a clutch responsive to the power means, ribbon feeding means actuated by the clutch, means controlled by the power means for feeding the wire within close proximity to the ribbon feeding means for twisting said wire, and means for cutting intermittently the twisted wire.

10. In a machine for making rosette blanks in combination with wire and ribbon supply therefor, power means associated therewith, a clutch responsive to the power means, automatic reciprocable ribbon feeding means actuated by the clutch, rotary means controlled by the power means for feeding wire adapted to be twisted within close proximity to the ribbon feeding means, means for cutting intermittently the twisted wires, and means for guiding the twisted wire to the cutting means.

11. In a machine for making rosette blanks or the like in combination with ribbon and wire supply therefor, of power means associated therewith, a clutch responsive to the power means, ribbon feeding means actuated by the clutch, means controlled by the power means for feeding wire adapted to be twisted within close proximity to the ribbon feeding means, means for intermittently cutting the twisted wire, and means for guiding the twisted wire to the cutting means.

12. In a machine for making rosette blanks in combination with ribbon and wire means therefor, of power means associated with said machine, a clutch responsive to the power means, reciprocable ribbon feeding means actuated by the clutch, means actuated by the power means for feeding the wire within close proximity to the ribbon feeding means, and means cooperatively associated with the power means for forming a predetermined number of loops.

13. In a machine for making rosette blanks in combination with ribbon and wire supply means therefor, power means associated therewith, of a clutch responsive to the power means, automatic ribbon feeding means actuated by the clutch, and means controlled by the power feeding means for feeding wire adapted to be twisted within close proximity to the ribbon feeding means for feeding wire adapted to be twisted within close proximity to the ribbon feeding means, and means cooperatively associated with the power means for forming a predetermined number of loops.

14. In a machine for making rosette blanks in combination with wire and ribbon supply means therefor, of power means associated therewith, a cam actuated clutch responsive to the power means, of a ribbon carrying needle actuated thereby, a wire twister having a cam slot, means for feeding wire to each side of the threaded needle, means operatively connected with the cam slot for forming loops in groups from said ribbon, means for guiding said groups, and means for cutting the wires of each group.

15. In a machine for making rosette blanks in combination with ribbon and wire supply means therefor, a base, power means supported thereby, and means responsive to said power means whereby a plurality of contiguous loops from the ribbon are formed in a group on the wire.

16. In a machine for making rosette blanks in combination with wire and ribbon supply means therefor, a frame, power means associated therewith, a clutch responsive to the power means, and ribbon feeding means actuated by said clutch.

17. In a machine for making rosette blanks in combination wire and ribbon supply means therefor, of power means associated therewith, a clutch responsive to the power means of automatic ribbon feeding means actuated by the clutch, and means controlled by the power means for feeding wire adapted to be twisted within close proximity to the ribbon feeding means, and means cooperatively associated with the power means for forming a predetermined number of loops from the ribbon into spaced groups.

18. A method of making rosette blanks from continuous strips of ribbon and wire which consists in simultaneously feeding the ribbon and wire, forming loops in said ribbon into groups and twisting the wire about one end of the loops.

19. A method of making rosette blanks from a continuous strip of ribbon and wire which consists of intermittently feeding the ribbon, forming a series of loops in the strip of ribbon and twisting the wire about one end of the loops.

20. A method of making rosette blanks from a continuous strip of ribbon and wire which consists of simultaneously feeding the ribbon and wire, forming a plurality of contiguous loops into groups from the ribbon and intermittently twisting the wire about one end of the loops.

21. A method of making rosette blanks from continuous strips of ribbon and wire which consists in simultaneously feeding the ribbon and wire, forming loops in said ribbon into groups and twisting the wire about one end of the loops, and automatically forming a predetermined number of loops in each group.

22. A method of making rosette blanks from continuous strips of ribbon and wire which consists in intermittently feeding the ribbon, forming a series of loops in groups in the continuous strip of ribbon and twisting the wire at one end of the loops and automatically forming a predetermined number of loops in each group.

23. A method of making rosette blanks from a continuous strip of ribbon and wire which consists of simultaneously feeding the ribbon and wire, forming a plurality of contiguous loops in groups from the ribbon, intermittently twisting the wire about one end of the loops, and forming automatically a predetermined number of loops in spaced groups.

24. A method of making rosette blanks from continuous strips of ribbon and wire which consists in simultaneously feeding the ribbon and wire transversely to each other, forming loops in said ribbon into groups, twisting the wire about one end of the loops and forming a predetermined number of loops in each group, and selectively severing each of the groups.

25. A method of making rosette blanks from continuous strips of ribbon and wire which consists in intermittently feeding the ribbon and wire transversely to each other, forming a series of loops in groups in the continuous strip of ribbon, twisting the wire about one end of the loops, forming a predetermined number of loops in each group, and selectively severing each of the groups.

26. A method of making rosette blanks from continuous strips of ribbon and wire which consists in simultaneously feeding ribbon and wire transversely to each other, forming a plurality of contiguous loops in spaced groups from the ribbon, intermittently twisting the wire about one end of the loops forming a predetermined number of loops in each group, and severing each of the groups.

27. An article of manufacture, a rosette blank comprising a series of contiguous loops of ribbon and wire, said wire and ribbon being twisted together at one end of the loops securing the ribbon and wire together.

28. As an article of manufacture a rosette blank embodying a series of independent but overlapping loops, and an elongated twisted wire fastening one end of the loops.

29. As an article of manufacture comprising a series of independent loops and a twisted wire securing one end of the loops.

30. As an article of manufacture, a rosette comprising a series of independent but overlapping loops in spaced groups, and twisted wire securing one end of the loops.

31. As an article of manufacture, a rosette blank comprising a series of contiguous but independent loops of ribbon and wire, said wire and ribbon being twisted together at one end of the loops securing the ribbon and wire together.

Signed at New York, in the county of New York and State of New York this 28th day of July A. D. 1927.

HOWARD W. COTTON